No. 888,694. PATENTED MAY 26, 1908.
C. H. CHAPMAN.
CHECK NUT.
APPLICATION FILED FEB. 4, 1903. RENEWED AUG. 12, 1907.
2 SHEETS—SHEET 1.
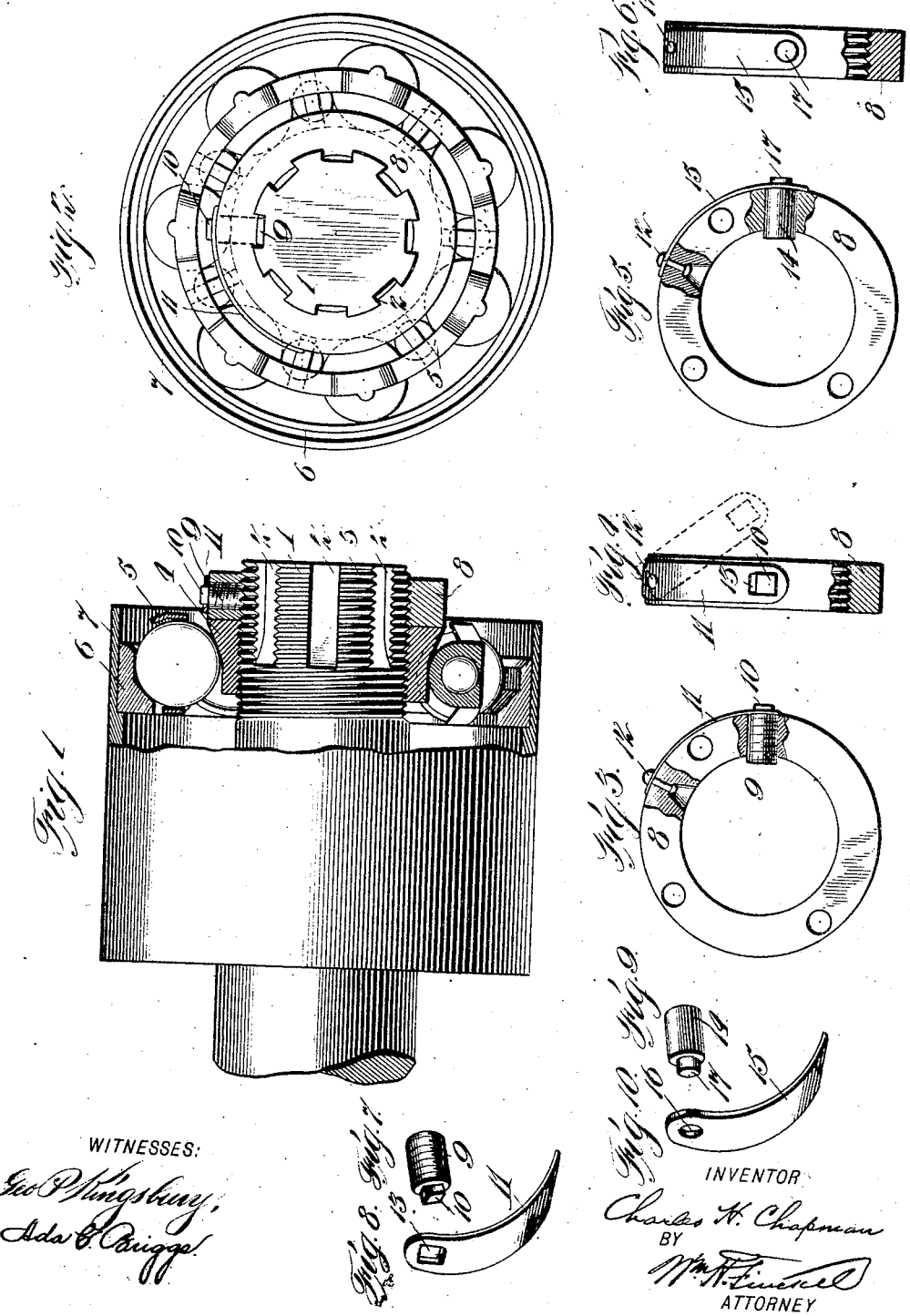
WITNESSES:
INVENTOR
Charles H. Chapman
BY
ATTORNEY No. 888,694.  
PATENTED MAY 26, 1908.  
C. H. CHAPMAN.  
CHECK NUT.  
APPLICATION FILED FEB. 4, 1903. RENEWED AUG. 12, 1907.
2 SHEETS—SHEET 2.
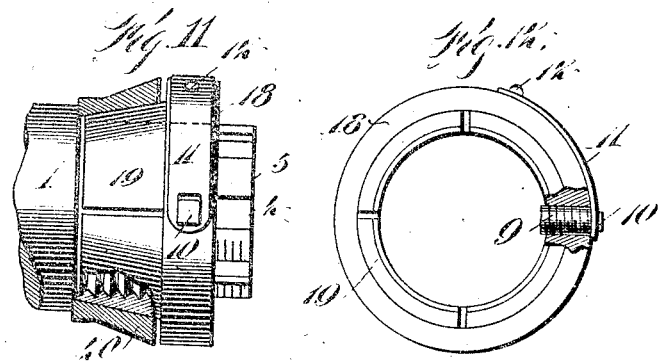
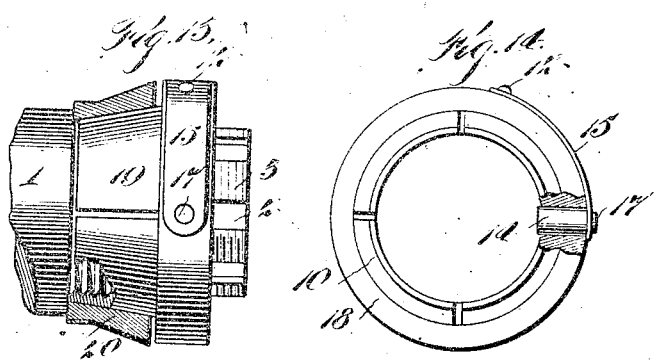
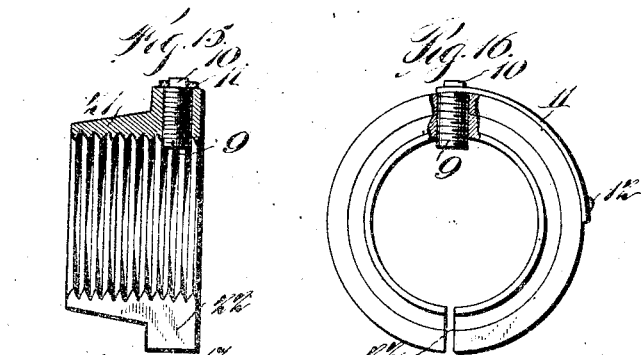
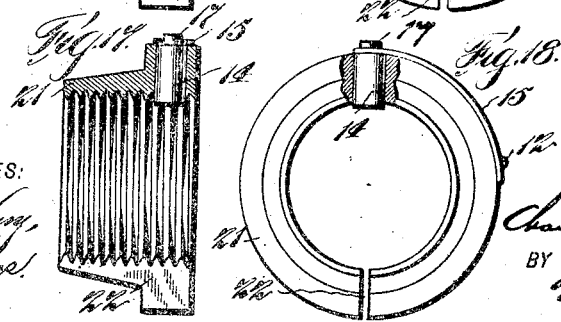
WITNESSES:
INVENTOR  
Charles H. Chapman  
BY  
ATTORNEY

UNITED STATES PATENT OFFICE.

CHARLES H. CHAPMAN, OF GROTON, MASSACHUSETTS.

CHECK-NUT.

No. 888,694.  Specification of Letters Patent.  Patented May 26, 1908.

Application filed February 4, 1903, Serial No. 141,881. Renewed August 12, 1907. Serial No. 388,248.

*To all whom it may concern:*

Be it known that I, CHARLES H. CHAPMAN, a citizen of the United States, residing at Groton, in the county of Middlesex and State of Massachusetts, have invented a certain new and useful Improvement in Check-Nuts, of which the following is a full, clear, and exact description.

The object of this invention is to provide a device for fixing an adjustable object in given position so that it may not become displaced in use.

Specifically the invention relates to a check-nut, that is to say, to a screwthreaded device capable of being screwed up against a nut or other adjustable object to hold it in given position.

The invention herein is particularly useful in securing or locking the adjustable cones of ball bearings, and it is herein so illustrated and described, but without thereby limiting the scope or applicability of the invention.

The invention consists of an annular or other shaped nut having a locking device comprising a flat spring rigidly applied to its periphery and engaging a stud which is arranged in the nut to engage the object to which the nut is applied and hold said nut in given position against displacement in either direction to lock another object in place.

In the accompanying drawings illustrating the invention, in the several figures of which like parts are similarly designated, Figure 1 is a side elevation and partial section of a ball bearing. Fig. 2 is an end view thereof. Fig. 3 is a front view and Fig. 4 an edge view, both partly in section, showing one form of check-nut. Fig. 5 is a front view and Fig. 6 an edge view of another form of check-nut. Figs. 7 and 8 show in perspective respectively the locking stud and its spring used in the check-nut of Figs. 1 and 3-4. Figs. 9 and 10 show in perspective respectively the locking stud and spring used in the check-nut of Figs. 5-6. Fig. 11 is a sectional side elevation and Fig. 12 a partly sectional rear elevation of the invention applied to another form of check-nut. Figs. 13 and 14 show views similar to Figs. 11 and 12, excepting that a plain stud is substituted for a screw stud. Figs. 15 and 16 show respectively a longitudinal section and a sectional rear elevation of another embodiment of the invention; and Figs. 17 and 18 are like Figs. 15 and 16, saving that an unthreaded or plain stud is substituted for a screw stud.

The screwthreaded axle 1 differs from any ordinary axle only in having longitudinal grooves 2 cut in its screwthreaded end 3. The adjustable cone 4 is applied to the screwthread of the axle and supports the ball bearing proper 5, here shown as a retainer containing load-bearing balls and separating balls, combined with a track 6 and a surrounding housing or other object 7. It is desirable to set up the cone to insure the proper working of the ball bearing, and this is done by running it in or out on the screwthread of the axle. When the desired adjustment is obtained, it is highly desirable to retain it against alteration by use, and to this end the check nut 8 is run on the threaded axle up against the cone and held in given position by a radial stud 9 engaging one of the grooves 2. As shown, this check nut is of ring form, but its contour may be as desired.

In Figs. 1, 3, 4 and 7 the stud is made as a screw, with a square or other head 10 by which it may be engaged to run it in and out of the ring. A flat spring 11 is secured peripherally to the ring by a rivet 12 or other means, and it has a hole 13 in its free end to engage the head of the stud and hold said stud from accidental displacement. When the stud is to be operated the spring 11 is lifted out of engagement with the head of the stud and turned aside upon its rivet, as indicated by the dotted lines in Fig. 4. Instead of a screw stud, there may be used a plain or unthreaded stud 14, as shown in Figs. 5, 6 and 9, which is held in place by spring 15 riveted to the ring as in Fig. 5, and having a round hole 16 to engage a round head 17 on the stud.

In Figs. 11 and 12 is shown a check-nut 18 having a tapering split shank 19, with the screw stud 9 and spring 11 applied to its head, such a device being designed chiefly for use in fixing the position of an adjustable cone 20.

In Figs. 13 and 14 the plain stud 14 and spring 15 are used in the same sort of split check-nut.

In Figs. 15 and 16 is shown a check-nut having a tapering shank 21, and split through shank and head as shown at 22, and having the screw stud 9 and spring 11 applied to its head; while Figs. 17 and 18 show a check-nut similar to that shown in Figs. 15 and 16, but with the plain stud 14 and spring 15.

The split check-nut by being contracted as it is screwed up into engagement with the cone, or other object, bites upon the axle and thus increases its hold upon the object to be locked.

In all cases the check-nut acts in that capacity as usual, but the locking stud coöperating with the groove in the axle fixes the check-nut practically beyond the possibility of displacement by accidental turning in either direction, and so insures stability of adjustment.

Of course, the locking stud and the coöperating part (the groove in the axle, in this instance) will be of such shape or character or construction as the parts upon which they are applied will require, and the invention is not limited to the details shown and described; since it is sufficient if the check-nut carries a movable part which may be set up fixedly against a fixed member and at the same time be capable of being freely disengaged therefrom when desired, without mutilation of parts and admitting of re-use.

What I claim is:—

1. A check-nut, a longitudinally grooved screwthreaded member to which it is applied, and an adjustable member on said screwthreaded member engaged by said check-nut, said check-nut having a radially arranged locking stud adapted to engage the groove for fixing said check-nut in given position against displacement in either direction, and a flat spring pivoted at one end to the nut and having a hole at its free end adapted to engage the stud to positively hold the stud from dislocation and also adapted to be lifted out of engagement with the stud and turned aside to permit the release of the stud and check nut.

2. A check-nut, a longitudinally grooved screwthreaded member to which it is applied, and an adjustable member on said screwthreaded member engaged by said check-nut, said check-nut made as an internally screwthreaded ring, having a radially arranged locking screw-stud adapted to engage the groove for holding said check-nut in engagement with said adjustable member against displacement in either direction, and a flat spring riveted to the nut by one end and its other end engaging the stud to positively hold said stud from turning and working loose, said spring capable of being disengaged from the stud and turned aside on its rivet.

3. A check nut, having a head and a tapering internally screw-threaded shank split longitudinally, and a locking stud arranged radially in said head for fixing said check nut in given position, and a flat spring having a hole engaging said stud, said spring pivotally and permanently fixed peripherally to said head.

4. A check nut, having a head and an externally tapering shank split longitudinally and screw-threaded internally, a locking screw-stud arranged radially in said check nut and having an angular head, and a flat spring pivoted peripherally to the head of the check nut and having an angular hole engaging said angular head to hold the said stud in position and capable of being lifted out of engagement with said stud and turned aside on its pivot.

In testimony whereof I have hereunto set my hand this second day of February, A. D. 1903.

CHARLES H. CHAPMAN.

Witnesses:
CHAS. S. HAYDEN,
W. E. PUTNEY.